(12) United States Patent
Newstadt et al.

(10) Patent No.: US 7,860,936 B1
(45) Date of Patent: *Dec. 28, 2010

(54) VERIFYING INSTANT MESSAGING ALIASES VIA ONLINE PARENTAL CONTROL ACCOUNTS

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/118,621

(22) Filed: May 9, 2008

(51) Int. Cl.
*G06F 15/16* (2006.01)
*G06F 7/04* (2006.01)
(52) U.S. Cl. .............................. 709/206; 726/4; 726/27; 726/28
(58) Field of Classification Search ................. 709/206; 726/4, 27, 28
See application file for complete search history.

(56) References Cited

U.S. PATENT DOCUMENTS

| | | | |
|---|---|---|---|
| 7,452,278 B2 | 11/2008 | Chen et al. | |
| 2002/0049806 A1 | 4/2002 | Gatz et al. | |
| 2003/0046097 A1* | 3/2003 | LaSalle et al. | 705/1 |
| 2004/0199582 A1* | 10/2004 | Kucharewski et al. | 709/204 |
| 2004/0205127 A1* | 10/2004 | Ben-Yoseph | 709/204 |
| 2006/0036701 A1* | 2/2006 | Bulfer et al. | 709/206 |
| 2006/0173792 A1* | 8/2006 | Glass | 705/75 |
| 2006/0242306 A1* | 10/2006 | Boro et al. | 709/227 |
| 2008/0005325 A1* | 1/2008 | Wynn et al. | 709/225 |
| 2009/0217342 A1 | 8/2009 | Nadler | |

OTHER PUBLICATIONS

Official Action received from USPTO dated Jan. 27, 2010 for U.S. Appl. No. 12/130,820, filed May 30, 2008.

\* cited by examiner

*Primary Examiner*—Philip J Chea
(74) *Attorney, Agent, or Firm*—Brill Law Office; Jeffrey Brill

(57) ABSTRACT

A parental control system is used to verify the identity of parents, based on children's instant messaging aliases. A plurality of verified parental accounts is maintained, each of which includes the identity of the parents and their children, including the children's instant messaging aliases. When a first child wishes to electronically communicate with a second child, s/he makes a request which includes the second child's alias. The parental accounts are searched for the second child's alias. If the alias is not found, instant messaging between the children is not allowed. If an account containing the alias is found, an identity verification request is transmitted, disclosing the identity of the first child's parents, and requesting reciprocal identity verification. Only if the second child's parents disclose their identity is the instant messaging between the children permitted.

17 Claims, 3 Drawing Sheets

VERIFYING INSTANT MESSAGING ALIASES VIA ONLINE PARENTAL CONTROL ACCOUNTS

TECHNICAL FIELD

This invention pertains generally to instant messaging, and more specifically to enabling parents to verify the identity of their children's instant messaging friends based on their aliases, using online parental control accounts.

BACKGROUND

Instant messaging ("IM") between children is very popular today. Although IM can be a great vehicle for children to establish and maintain friendships, it also puts children at risk for exposure to bad influences and even electronic predators. Because the communication is electronic in nature, it is easy for people to pretend to be who they are not, and very hard for parents to keep track of with whom their children are communicating.

Online-based parental control systems exist today. A key aspect of online parental control is the ability for parents to control with whom a child communicates online. Such systems enable parents to require that children receive permission to add friends to the list of parties with whom they can communicate. Unfortunately, even with such systems, the only mechanism parents have for actually determining the true identities of their child's IM buddies is to ask their child. The response of children is not reliable in this context, as children can be dishonest or themselves the victims of other's dishonesty. Without being able to determine with whom their children are really requesting permission to communicate, the power to approve or deny the requests is not sufficient. There is no existing substantive mechanism to verify the identity behind an IM alias before a child is granted permission to communicate with it.

In the non-electronic world, parents know the identity of their children's friends through knowledge of the friend's patents. If Mr. and Ms. Smith know Mr. and Ms. Jones, the Smiths know roughly who the Jones children are, and can make an intelligent determination as to whether they wish to permit their own children to interact with them. It would be desirable to provide a corresponding measure of security in the IM context.

SUMMARY

An online-based parental control system is used to verify the identity of children and their parents, based on children's instant messaging aliases. This way, a child's instant messaging buddies can be limited to children whose parents have been securely identified. More specifically, the online-based parental control system maintains a plurality of verified parental accounts, each of which includes the identity of the parents and their children, including the children's instant messaging aliases. When a first child wishes to electronically communicate with a second child, the first child makes a request which includes the second child's, instant messaging alias. The system searches the plurality of parental accounts for one containing the second child's alias. If the alias is not found, instant messaging between the children is not allowed. If a parental account containing the alias is found, an identity verification request is transmitted to the parents of the second child. The identity verification request discloses the identity of the first child's parents, and requests reciprocal verification of the identity of the parents of the second child. Only if the second child's parents respond by disclosing their identity is the instant messaging between the children permitted.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
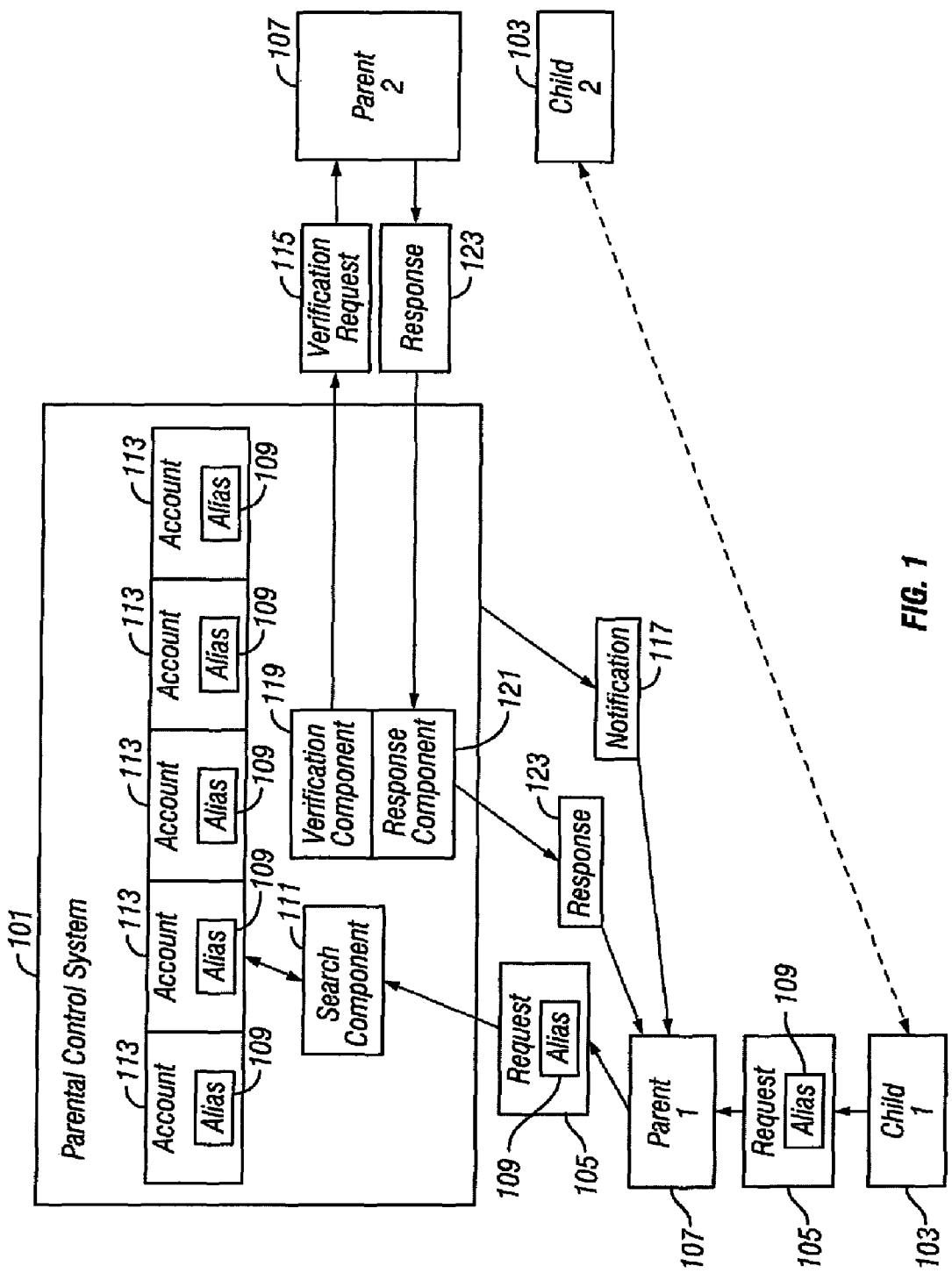
FIG. 1 is a block diagram illustrating a system for verifying the identity of children's IM friends, according to some embodiment of the present invention.

FIG. 1 illustrates a system for enabling parents 107 to verify the identity of their children's 103 IM friends using online parental control accounts 113, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, aspects of the present invention are built on top of an online-based parental control system 101. Such a 101 system provides both parental control enforcement at the user computer level, parental control management via the Web, and workflow management to allow children 103 to request permission to communicate with specific IM aliases 109. As part of such systems 101, participating parents 107 create online accounts 113, verified by credit card or other concrete real world mechanism, and specify their children's IM aliases 109.

As illustrated, a child 103 (e.g., "Jon") can issue a request 105 to his parents 107 to communicate with another child 103 (e.g., "Jane"). The request 105 includes the IM alias 109 of the child 103 with whom the requesting child 103 wishes to communicate (in this example, Jon's request 105 includes Jane's alias 109). Based on the request 105, an IM alias search component 111 searches the parental accounts 113 on the parental control system 101 for Jane's IM alias 109. In one embodiment, Jon's parents 107 approve the request 105 to initiate the search, whereas in another, the search executes automatically responsive to the request 105. In either case, if a parental account 113 containing Jane's alias 109 is found, the search component 111 identifies the parental account 113 with which the alias 109 is associated (i.e., the account 113 maintained by Jane's parents 107). In other words, the IM alias search component 111 determines whether a particular alias 109 can be verified through a corresponding parental account 113, and if so to which parental account 113 a verification request 115 should be sent.

If Jane's IM alias 109 is not found, then the search component 111 sends a notification 117 to Jon's parents 107 indicating that Jane's identity cannot be verified, and IM communication between Jon and Jane is not allowed. On the other hand, if Jane's IM alias 109 is found, an identity verification request component 119 can transmit a verification request 115 from Jon's parents 107 to Jane's parents 107, typically using the workflow management functionality of the parental control system 101. The parental controls system 101 displays the verification request 115 to the target account's 113 owner (i.e., Jane's parents 107). The verification request 115 informs Jane's parents 107 that Jon is requesting to IM with their child Jane. This notification discloses the identity of Jon's parents 107 and their relationship to Jon (as verified by the credit card associated with the account 113), and requests the reciprocal verification of the identity of Jane's parents 107 (again, as verified on the account) and the confirmation of Jane's status as their child 103.

Based on the information in the verification request 115, Jane's parents 107 may choose whether or not to respond, and by extension whether or not to allow Jane to IM with Jon. If Jane's parents 107 decide not to send a response 123 to the verification request 115 (or send a response indicating that they decline to disclose their identity), Jon and Jane are not allowed to engage in IM communication. Under such circumstances, in some embodiments, Jon's parents 107 receive a notification 117 indicating that their identity verification request 115 has been rejected.

On the other hand, to allow the children 103 to communicate, Jane's parents 107 send a reply 123 to the identity verification request 115, providing their identity to Jon's parents 107. If they choose to do this, an identity verification response component 121 uses the workflow management functionality of the parental control system 101 to send the response 123 to the verification request 115 back to Jon's parents 107. The response 123 includes the identities of Jane's parents 107, and confirms that Jane is their child 103. In some embodiments, once this response 123 has been received, the parental controls system 101 automatically allows IM communication between the two children 103. In other embodiments, the originating party (e.g., Jon's parents 107) reviews the response 123, and then transmits an indication 127 to the parental controls system 101 as to whether or not to allow the communication.

Figure 2:
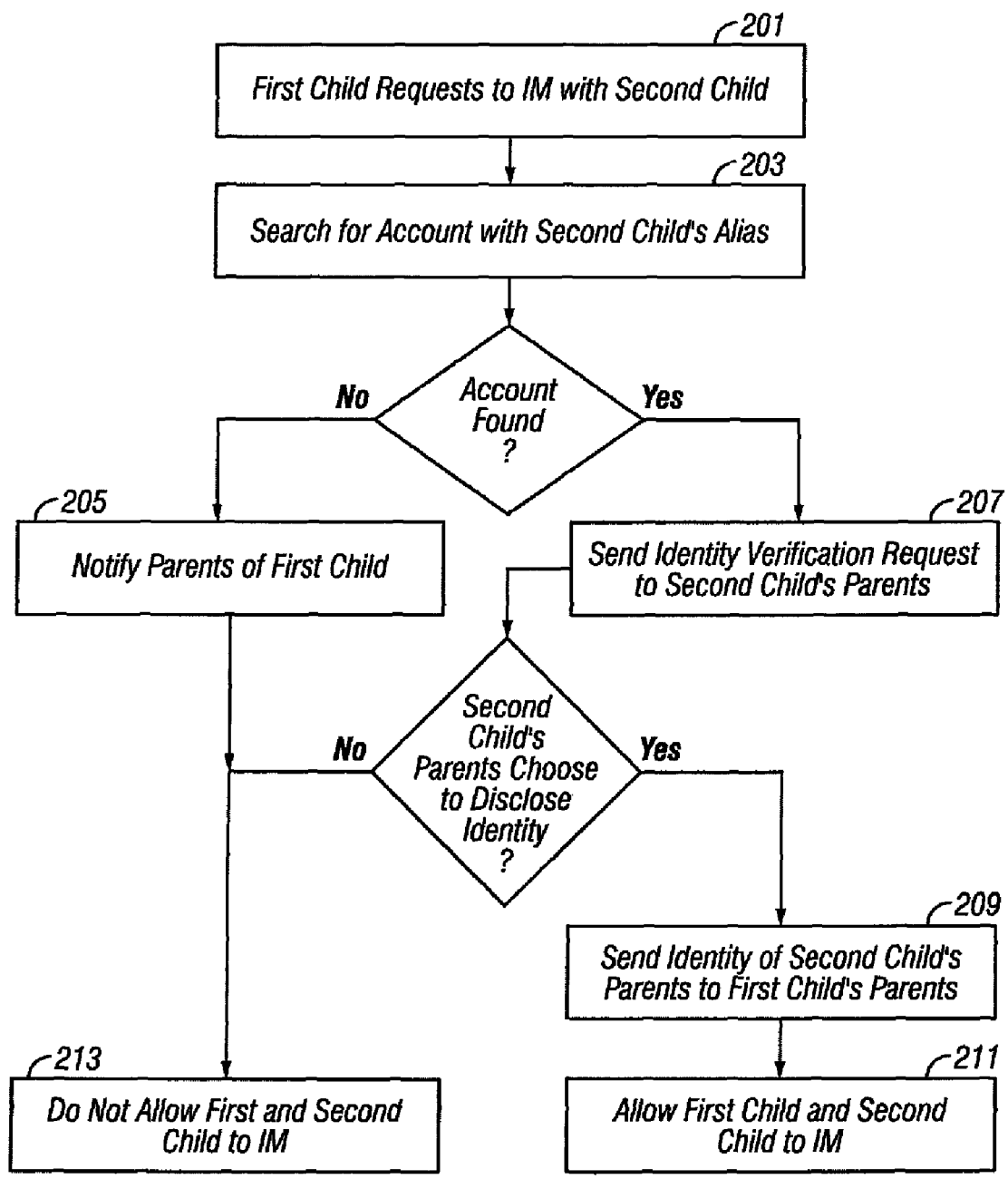
FIG. 2 is a flowchart illustrating steps for verifying the identity of children's IM friends, according to some embodiment of the present invention.

FIG. 2 is a flowchart illustrating steps for performing the workflow to practice certain embodiments of the present invention. As illustrated in FIG. 2, a first child 103 makes 201 a request 105 to his parents 107 to communicate with a second child 103. The request 105 includes the second child's IM alias 109. Responsive to the request 105, the search component 111 searches 203 the parental accounts 113 for an account 113 that includes the IM alias 109 of the second child 103. If no account containing the second child's IM alias 109 is located, a notification 117 is transmitted 205 to the parent's 107 of the first child 103, indicating that the identity of the second child 103 cannot, be verified. In this case, in communication between the children is not allowed 213.

On the other hand, if a parental account 113 containing the second child's IM alias 109 is found, the identity verification request component 119 transmits 207 a verification request 115 from the parents 107 of the first child 103 to the second child's parents 107. The identity verification request 115 contains the identity of the first child's parents 107, and indicates that the first child 103 is requesting to communicate with the second child 103.

Responsive to the identity verification request 115, the parents 107 of the second child 103 can send 209 a response 123 containing their identities, in which case the first and second child 103 are allowed 211 to communicate. The second child's parents 107 can instead elect not to disclose their identities, in which case communication between the children is not allowed 213.

Figure 3:
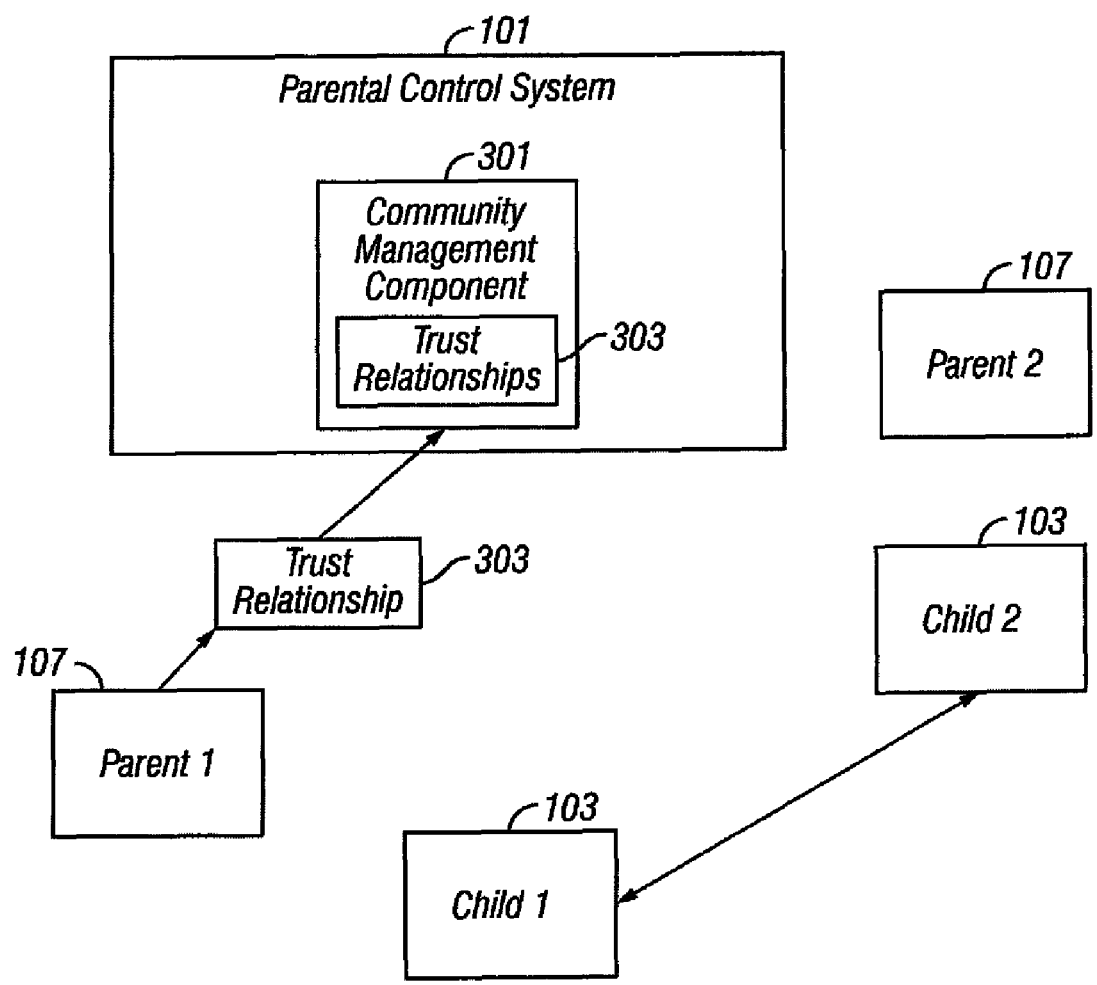
FIG. 3 is a block diagram illustrating a community management component which enables an account owner to create trust connections, according to some embodiment of the present invention.

Turning now to FIG. 3, in some embodiments of the present invention, a community management component 301 enables an account 113 owner (i.e., a parent 107) to create trust connections 303 with other account 113 owners on the system 101. In such embodiments, a parent can effectively choose to skip all identity and/or request workflow for others whom they have already identified as being trusted members of their community. In other words, by establishing defined trust relationships with family members and friends on the system 101, a parent 107 is not required to process their child's requests 105 or to perform identity verifications 303 for those who are already part of their trust circle 303.

The present specification discusses embodiments of the present invention using the examples of parents 107 governing the IM activities of their children 103. The terms parents 107 and children 103 as used herein are not limited to that specific literal relationship, but can encompass any two parties in which one party is responsible for controlling the electronic communication of the other (e.g., teachers and students, counselors and charges, employers and employees, etc.). Additionally, the electronic communication being governed is not limited to IM activity, but in other embodiments can comprise other formats, such as electronic chatting, e-mailing, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A machine implemented method for verifying electronic communication aliases, the method comprising the steps of:
    maintaining a plurality of verified parental accounts, each verified parental account comprising at least a verified identity of at least one parent and at least one electronic communication alias of at least one associated child account;
    receiving a request from a first child account to an associated parent account to allow electronic communication with a second child account, the request comprising at least an electronic communication alias associated with the second child account;
    searching the plurality of parental accounts for the electronic communication alias associated with the second child account;
    responsive to finding a parental account containing the electronic communication alias associated with the second child account, transmitting an identity verification request to a parent associated with the second child, the identity verification request disclosing the identity of the parent associated with the first child, and requesting reciprocal verification of the identity of the parent associated with the second child account; and
    at least partially responsive to results of the searching step, determining whether to allow electronic communication between the first child account and the second child account.

2. The method of claim 1 further comprising:
    receiving a response to the identity verification request from the parent account associated with the second child account, the response disclosing the identity of the parent associated with the second child account.

3. The method of claim 2 further comprising:
    transmitting the received response to the identity verification request to the parent account associated with the first child account; and
    allowing electronic communication between the first child and account the second child account.

4. The method of claim 1 further comprising:
    not allowing electronic communication between the first child account and the second child account, responsive to a condition from a group of conditions consisting of: 1) not receiving a response to the identity verification request from the parent account associated with the second child account, 2) receiving a response to the identity verification request from the parent account associated with the second child account, the response indicating that the parent associated with the second child account elects not to disclose their identity.

5. The method of claim 4 further comprising:
    transmitting a notification to the parent account associated with the first child account, the notification indicating that the parent associated with the second child account has not disclosed their identity.

6. The method of claim 1 wherein electronic communication comprises at least one type of electronic communication from a group consisting of:
    instant messaging;
    electronic chatting; and
    electronic mail.

7. The method of claim 1 further comprising:
    receiving an identification of at least one trusted party from a parent account;
    receiving a request from a first child account associated with the parent account to allow electronic communication with a second child account;
    determining that the second child account is associated with a party identified as being trusted by the parent account; and
    allowing electronic communication between the first child account and the second child account without further verifying the identity of a parent associated with the second child account.

8. At least one non-transitory machine readable storage medium containing a computer program product for verifying electronic communication aliases, the computer program product comprising:
    program code for maintaining a plurality of verified parental accounts, each verified parental account comprising at least a verified identity of at least one parent and at least one electronic communication alias of at least one associated child account;
    program code for receiving a request from a first child account to an associated parent account to allow electronic communication with a second child account, the request comprising at least an electronic communication alias associated with the second child account;
    program code for searching the plurality of parental accounts for the electronic communication alias associated with the second child account;
    program code for responsive to finding a parental account containing the electronic communication alias associated with the second child account, transmitting an identity verification request to a parent associated with the second child account, the identity verification request disclosing the identity of the parent associated with the first child account, and requesting reciprocal verification of the identity of the parent associated with the second child account; and
    program code for at least partially responsive to results of the searching step, determining whether to allow electronic communication between the first child account and the second child account.

9. The computer program product of claim 8 further comprising:
    program code for receiving a response to the identity verification request from the parent account associated with the second child account, the response disclosing the identity of the parent associated with the second child account.

10. The computer program product of claim 9 further comprising:
    program code for transmitting the received response to the identity verification request to the parent account associated with the first child account; and
    program code for allowing electronic communication between the first child account and the second child account.

11. The computer program product of claim 9 further comprising:
    program code for transmitting the received response to the identity verification request to the parent associated with the first child account; and
    program code for, only in response to receiving an approval from the parent account associated with the first child account, allowing electronic communication between the first child account and the second child account.

12. The computer program product of claim 8 further comprising:
    program code for not allowing electronic communication between the first child account and the second child account, responsive to a condition from a group of conditions consisting of: 1) not receiving a response to the identity verification request from the parent account associated with the second child account, 2) receiving a response to the identity verification request from the parent account associated with the second child account, the response indicating that the parent account associated with the second child account elects not to disclose their identity.

13. The computer program product of claim 12 further comprising:
    program code for transmitting a notification to the parent account associated with the first child account, the notification indicating that the parent account associated with the second child account has not disclosed their identity.

14. The computer program product of claim 8 further comprising:
    program code for, responsive to receiving the request from the first child account to the associated parent account to allow electronic communication with the second child account, transmitting the request to the parent account associated with the first child account; and
    program code for, only in response to receiving an approval from the parent account associated with the first child account, searching the plurality of parental accounts for the electronic communication alias associated with the second child account.

15. The computer program product of claim 8 wherein electronic communication comprises at least one type of electronic communication from a group consisting of:
    instant messaging;
    electronic chatting; and
    electronic mail.

16. The computer program product of claim 8 further comprising:
    program code for receiving an identification of at least one trusted party from a parent account;
    program code for receiving a request from a first child account associated with the parent account to allow electronic communication with a second child account;
    program code for determining that the second child account is associated with a party identified as being trusted by the parent account; and
    program code for allowing electronic communication between the first child account and the second child account without further verifying the identity of a parent associated with the second child account.

17. A system for verifying electronic communication aliases, the system comprising:
    means for maintaining a plurality of verified parental accounts, each verified parental account comprising at least a verified identity of at least one parent and at least one electronic communication alias of at least one associated child account;
    means for receiving a request from a first child account to an associated parent account to allow electronic communication with a second child account, the request comprising at least an electronic communication alias associated with the second child account;
    means for responsive to finding a parental account containing the electronic communication alias associated with the second child account, transmitting an identity verification request to a parent associated with the second child account, the identity verification request disclosing the identity of the parent associated with the first child account, and requesting reciprocal verification of the identity of the parent associated with the second child account;
    means for searching the plurality of parental accounts for the electronic communication alias associated with the second child account; and
    means for, at least partially responsive to results of the searching step, determining whether to allow electronic communication between the first child account and the second child account.

* * * * *